Dec. 9, 1952  F. O. HICKLING  2,621,091
ANTIFRICTION BEARING
Filed Nov. 18, 1948  2 SHEETS—SHEET 1

INVENTOR
Frederick O. Hickling
BY
ATTORNEY

Dec. 9, 1952   F. O. HICKLING   2,621,091
ANTIFRICTION BEARING
Filed Nov. 18, 1948   2 SHEETS—SHEET 2

INVENTOR
Frederick O Hickling
BY
ATTORNEY

Patented Dec. 9, 1952

2,621,091

UNITED STATES PATENT OFFICE 2,621,091

ANTIFRICTION BEARING

Frederick Osgood Hickling, West Bridgford, Nottingham, England, assignor to Ransome and Marles Bearing Company, Limited, Nottingham, England, a British company Application November 18, 1948, Serial No. 60,805
In Great Britain September 1, 1947

4 Claims. (Cl. 308—187.2)

This invention relates to improvements in anti-friction bearings and particularly to improvements in sealing means, for such bearings, to prevent the entrance of foreign matter into the bearing and leakage of lubricant.

The object of the present invention is to provide a bearing with a grease shield or the like which will have concentricity and a satisfactory fitting in the bearing.

A further object is to provide a grease seal or the like which will be wholly positioned within the ring members of a bearing unit of any type, the arrangement being such that the grease shield or seal will be retained in a concentric position with the bearing tracks.

With these and other objects in view the invention is characterised in that the grease shield or the like is formed with a circumferential retaining lip of convex shape adapted to effect concentric location from the corners or edges resulting from a ground bore or surface of a ring member and a circumferential groove formed in the said ring member, the said shield or seal being also located axially by these means.

The invention further consists in forming the retaining lip inwardly of a shield of cup-like form and in so shaping this lip as to give the seal a lead in when it is assembled in the bearing.

The invention still further consists in fitting to the shield a synthetic rubber protection member or the like of substantially L shape in section preferably adapted to provide a knife edged sealing lip to positively prevent the entrance of dirt to the bearing.

The invention will now be described with reference to the accompanying drawing in which.

Figure 1:
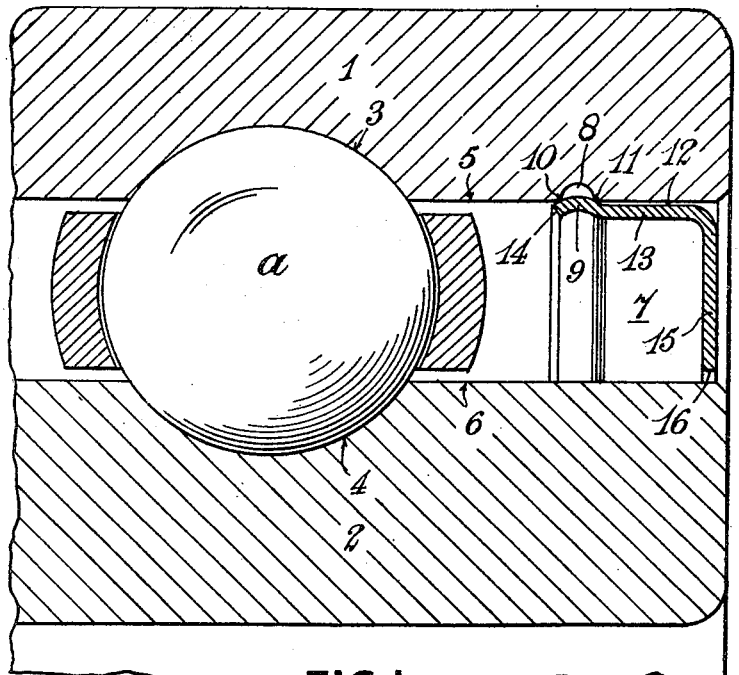
Fig. 1 is a part sectional elevation of anti-friction bearing having a grease shield fitted according to one form of this invention.

As shown more particularly in Fig. 1, the outer and inner bearing rings 1 and 2 respectively of an anti-friction bearing such a a ball bearing are extended in width on one or both sides of the rolling tracks 3 and 4 for the balls a. These tracks 3 and 4 and the extended adjacent surfaces 5 and 6 of the rings 1 and 2 are ground so that ground seating surfaces will be provided for a grease or lubricating seal 7 which is inserted within the said extensions. Adjacent to the rolling track 3 of for instance the outer ring 1 is formed a groove 8 of substantially semi-circular, U or other convenient shape in cross section. This groove 8 is formed on one or both sides of the rolling track so that the ring like shield or grease seal 7 may be fitted on one or both sides of the bearing as desired. The grease shield or seal 7 is of substantially cup-like form of L shape in cross section and formed with a retaining lip 9 of convex shape on its periphery which is adapted to so co-operate with the edges 10 and 11 of the groove 8 and the adjacent ground surface 5 that the shield will be located and held in a concentric position. The curvature of the lip 9 is such that it will give the shield or seal 7 a lead in when it is being assembled in the bearing. This curvature is of shallow formation as shown and so formed that it contacts with the two circumferential outer edges 10 and 11 of the groove 8 but the contact is such that the grease shield or seal 7 will be located radially in a concentric position and at the same time retained against axial movement. The lip 9 is so formed on the periphery of the cup-like shield that the remaining outer surface 12 of the shield 7 is just clear of the ground surface 5. This lip 9 is thus in the form of a small radius on the outer edge of the cylindrical portion 13 of the shield 7. The inner edge 14 of the lip 9 may extend slightly within the body of the shield 7 or arranged substantially level with its inner surface. The inward extension or base 15 of the shield which is disposed at right angles to the ground surfaces is so arranged and formed with a bore 16 as to be just clear of the ground surface 6 of the inner ring 2 of the bearing. This shield 7 may be of drawn mild steel or of spring steel either of which may be heat treated or otherwise but it is preferably of stainless steel.

Figure 2:
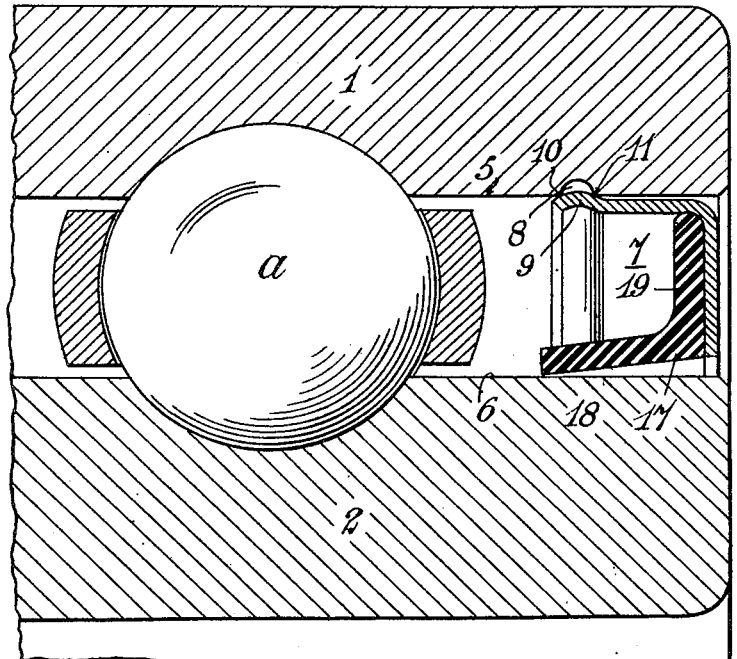
Fig. 2 is a similar view showing a pad fitted to the grease shield.

In the construction shown in Fig. 2 this cup-like shield 7 is fitted in any suitable manner with a ring-like pad 17 or protection member of substantially L shape in cross section. This pad 17 is preferably formed of synthetic rubber or like material and moulded or vulcanized in position. The width of the cylindrical portion 18 of the pad 17 is substantially equal to the depth of the cup-like shield 7 so as to provide a satisfactory sealing lip at its inner edge to contact with the ground surface 6 of the inner member 2. As shown, the cylindrical portion may be conically shaped to give a knife edge sealing lip. The other or right angularly disposed arm or flange 19 of the ring-like pad 17 may be secured to the inward extension or base 15 of the shield by being moulded thereon or by vulcanizing or by any suitable clamping means. It will be seen that in cross section the shield member 7 and the sealing pad 17 carried thereby form three sides of a square with the opening facing the balls a or rollers of the bearing, one side or base of the square being formed by the thickness of the pad 17 and the thickness of the shield member 7 at the inward extension or base 15 thereof. It will be understood that the shield member as above described may be fitted at each side of the rolling track of a bearing and that the sealing ring or pad 17 may be fitted or omitted as desired.

Figure 3:
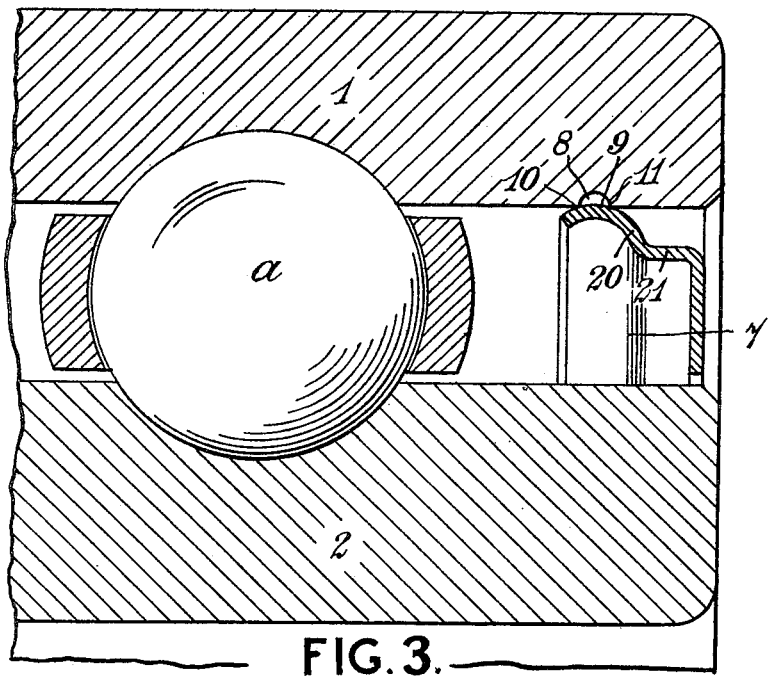
Fig. 3 is a part sectional elevation of an anti-friction bearing showing a modified form of grease shield.
Figures 4, 5:
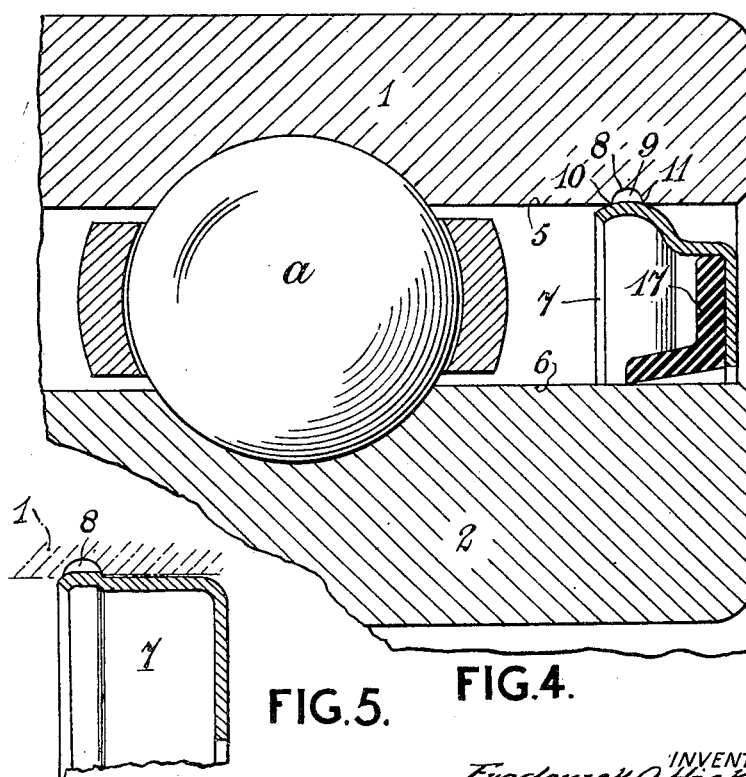
Fig. 4 is a similar view showing a pad fitted to the grease shield.
Fig. 5 is a detail of a slightly modified form of lip.

In a modified construction as shown in Fig. 3 the cross sectional shape of the cup-like shield 7 may be varied. For instance the cylindrical portion may be stepped at 20 so that the shield 7 will have two diameters one diameter 21 being more remote from the ground surface 5 and the other forming the circumferential lip 9 to engage the edges 10 and 11 of the groove 8 in the ground surface 5. Obviously the pad 17, as previously described, of rubber or any other suitable material of any convenient width for contacting with the inner ring member may be fitted as shown in Fig. 4. Fig. 5 shows a slightly modified form of lip 9. In this form the convexity is slightly flattened. The above described shields are adapted to be detachably fitted to the outer bearing ring but the construction may be varied for fitting to the inner ring. In this case the groove 8 for co-operating with the curved lip 9 would be formed on the inner bearing ring 2 and the flange 15 of the shield 7 would be arranged radially outwardly to carry a sealing pad 17 when it is desired to use a pad in conjunction with the shield 7.

What I claim is:

1. In a sealing means for an anti-friction bearing including inner and outer bearing rings having tracks in their opposed circumferences with anti-friction bearings mounted in said tracks between said rings, the rings having a ground seating surface on at least one side of the tracks and at least one ring having an annular groove in its seating surface, a grease shield and seal comprising an annular member of radial L-section and having cylindrical and annular radial portions with a smooth circumscribing rib projecting from said cylindrical portion in the opposite direction from said annular radial portion, said member being mounted between said bearing ring seating surfaces with said rib seated in said groove and said annular radial portion substantially spanning the distance between said surfaces, said rib being of larger radius than the bearing ring groove and engaging only with the edges of the groove to concentrically locate the shield relative to the bearing rings and with the cylindrical portion of the member spaced from the grooved seating surface and the free edge of the annular radial portion of said member clearing the seating surface of the other bearing ring.

2. In a sealing means as defined in column 1, the combination of an annular sealing element of L-section and formed of resilient material, said element including an annular radial part mounted on said member radial portion and a conical part extending from said radial part concentrically coincident with said member cylindrical portion and with its free edge portion in engagement with the seating surface of said other bearing ring.

3. A sealing means for an anti-friction bearing including inner and outer bearing rings having tracks in their opposed circumferences and anti-friction bearings mounted between said rings and in said tracks, said rings extending beyond at least one side of said tracks with the opposed circumferential surfaces of the extended portions of said rings being ground to provide spaced annular seating surfaces, the annular seating surface of the outer ring being formed with an annular concave groove having circumscribing edges of uniform diameter at the sides thereof, a grease shield and seal in the form of an annular cup-like member of substantially L-section and including a cylindrical portion and an inwardly extending annular radial portion, the cylindrical portion of said member being formed with an outwardly projecting circumferential retaining lip at its inner end, said lip being of uniform convex shape and of larger radius than said groove, said member being mounted between said bearing rings with said lips nested in said groove in engagement with the circumscribing edges of the groove only and concentrically locating said member with the inner edge of the annular radial portion of said member clearing the seating surface of the inner ring and the circumferential portion of said member spaced slightly from the seating surface of the outer ring.

4. A sealing means for an anti-friction bearing as set forth in claim 3, wherein a ring-like pad of resilient material and substantially L-shaped cross-section is formed with a radial part anchored against the interior face of the member radial portion, said pad also being formed with an annular part concentrically coincident with said member cylindrical portion and sloping from the inner edge of the member radial portion to engagement at its free edge with the ground surface of the inner bearing ring to form a seal, the free edge of the lip extending slightly inwardly of the member cylindrical portion to form a lead-in to facilitate insertion of the sealing member between the bearing rings.

FREDERICK OSGOOD HICKLING.

REFERENCES CITED

The following references are of record in the file of this patent:

UNITED STATES PATENTS

| Number | Name | Date |
|---|---|---|
| 2,034,567 | Fernstrom | Mar. 17, 1936 |
| 2,098,205 | Eksergian | Nov. 2, 1937 |
| 2,145,928 | Heinze et al. | Feb. 7, 1939 |
| 2,172,325 | Victor et al. | Sept. 5, 1939 |
| 2,185,339 | Hicklin | Jan. 2, 1940 |
| 2,264,062 | Wilder | Nov. 25, 1941 |

FOREIGN PATENTS

| Number | Country | Date |
|---|---|---|
| 98,579 | Sweden | of 1940 |
| 561,242 | Germany | of 1932 |